(12) United States Patent
Vilem et al.

(10) Patent No.: US 10,495,862 B2
(45) Date of Patent: Dec. 3, 2019

(54) AUTOMATED LUMINAIRE HAVING A ZOOM OPTICAL SYSTEM

(71) Applicant: Robe Lighting s.r.o., Rosnov pod Radhostem (CZ)

(72) Inventors: Jan Vilem, Vsetin (CZ); Josef Valchar, Prostredni Becva (CZ)

(73) Assignee: Robe Lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 16/059,666

(22) Filed: Aug. 9, 2018

(65) Prior Publication Data
US 2018/0347788 A1    Dec. 6, 2018

Related U.S. Application Data

(60) Provisional application No. 62/553,324, filed on Sep. 1, 2017.

(51) Int. Cl.
*G02B 15/173* (2006.01)
*F21V 14/06* (2006.01)
(Continued)

(52) U.S. Cl.
CPC .......... *G02B 15/173* (2013.01); *F21S 10/007* (2013.01); *F21V 5/008* (2013.01);
(Continued)

(58) Field of Classification Search
CPC ........ G02B 15/14; G02B 15/15; G02B 15/16; G02B 15/28; G02B 15/167; G02B 15/173;
(Continued)

(56) References Cited

U.S. PATENT DOCUMENTS

| 4,466,708 A | 8/1984 | Betensky |
| 5,589,986 A | 12/1996 | Shibata |

(Continued)

FOREIGN PATENT DOCUMENTS

JP    2000292690 A    10/2000

OTHER PUBLICATIONS

Office Action dated Dec. 21, 2018; U.S. Appl. No. 16/156,794, filed Oct. 10, 2018; 24 pages.

(Continued)

*Primary Examiner* — Sultan Chowdhury
(74) *Attorney, Agent, or Firm* — Conley Rose, P.C.; Grant Rodolph; Brooks W Taylor (57) ABSTRACT

A zoom optical system and automated luminaire are provided. The zoom optical system includes a light source, a compensator lens group, a variator lens group, and an objective lens group. The light source illuminates an object located in an object plane. The compensator lens group is optically coupled to the object, has a first positive optical power, and moves relative to the object plane. The variator lens group is optically coupled to the compensator lens group, has a negative optical power, and moves relative to the object plane and the compensator group. The objective lens group is optically coupled to the variator lens group, has a second positive optical power, remains in a fixed position relative to the object plane, and projects an image of the object.

18 Claims, 5 Drawing Sheets

(51) Int. Cl.
<table>
<tr><td>G02B 7/10</td><td>(2006.01)</td></tr>
<tr><td>F21S 10/00</td><td>(2006.01)</td></tr>
<tr><td>G02B 15/14</td><td>(2006.01)</td></tr>
<tr><td>G02B 13/16</td><td>(2006.01)</td></tr>
<tr><td>G02B 15/15</td><td>(2006.01)</td></tr>
<tr><td>G02B 7/04</td><td>(2006.01)</td></tr>
<tr><td>G02B 7/08</td><td>(2006.01)</td></tr>
<tr><td>G02B 15/163</td><td>(2006.01)</td></tr>
<tr><td>F21V 5/00</td><td>(2018.01)</td></tr>
<tr><td>F21W 131/107</td><td>(2006.01)</td></tr>
<tr><td>F21W 131/406</td><td>(2006.01)</td></tr>
</table>

(52) U.S. Cl.
CPC ............... *F21V 14/06* (2013.01); *G02B 7/04* (2013.01); *G02B 7/08* (2013.01); *G02B 7/102* (2013.01); *G02B 13/16* (2013.01); *G02B 15/14* (2013.01); *G02B 15/15* (2013.01); *G02B 15/163* (2013.01); *F21W 2131/107* (2013.01); *F21W 2131/406* (2013.01)

(58) Field of Classification Search
CPC .......... F21S 10/02; F21S 10/06; F21S 10/007; F21S 10/026; F21V 14/06; F21V 14/065
See application file for complete search history.

(56) References Cited

U.S. PATENT DOCUMENTS

<table>
<tr><td>5,600,490 A *</td><td>2/1997</td><td>Sugawara ............ G02B 15/173<br>359/687</td></tr>
<tr><td>5,790,316 A</td><td>8/1998</td><td>Terasawa et al.</td></tr>
<tr><td>7,477,459 B2</td><td>1/2009</td><td>Liao</td></tr>
<tr><td>7,583,442 B2</td><td>9/2009</td><td>Cathey, Jr. et al.</td></tr>
<tr><td>2003/0007256 A1</td><td>1/2003</td><td>Usui et al.</td></tr>
<tr><td>2005/0052872 A1</td><td>3/2005</td><td>de Peralta</td></tr>
<tr><td>2005/0286250 A1</td><td>12/2005</td><td>Tanaka et al.</td></tr>
<tr><td>2006/0045503 A1</td><td>3/2006</td><td>Ishizuka et al.</td></tr>
<tr><td>2007/0052834 A1</td><td>3/2007</td><td>Hashimoto et al.</td></tr>
<tr><td>2008/0019019 A1</td><td>1/2008</td><td>Kawakami et al.</td></tr>
<tr><td>2009/0015935 A1</td><td>1/2009</td><td>Szapiel et al.</td></tr>
<tr><td>2010/0321940 A1</td><td>12/2010</td><td>Zhong</td></tr>
<tr><td>2012/0314300 A1</td><td>12/2012</td><td>Yamano</td></tr>
<tr><td>2013/0050568 A1</td><td>2/2013</td><td>Adachi et al.</td></tr>
<tr><td>2014/0204351 A1</td><td>7/2014</td><td>Matsuo</td></tr>
<tr><td>2014/0347524 A1 *</td><td>11/2014</td><td>Iwasawa ................ G02B 15/17<br>348/240.3</td></tr>
<tr><td>2015/0293433 A1</td><td>10/2015</td><td>Jurek</td></tr>
<tr><td>2015/0305087 A1</td><td>10/2015</td><td>Leigh Blakeney</td></tr>
<tr><td>2017/0199361 A1 *</td><td>7/2017</td><td>Oe ...................... G02B 15/177</td></tr>
<tr><td>2018/0059392 A1</td><td>3/2018</td><td>Amano et al.</td></tr>
</table>

OTHER PUBLICATIONS

Final Office Action dated Mar. 6, 2019; U.S. Appl. No. 16/156,794, filed Oct. 10, 2018; 27 pages.
European Extended Search Report; Application No. 18192001.8; dated Jan. 30, 2019; 7 pages.
ESTA; "American National Standard ANSI E1.11—2008 (R2018) Entertainment Technology—USITT DMX512-A Asynchronous Serial Digital Data Transmission Standard for Controlling Lighting Equipment and Accessories"; CP/2007-1013r3.1; Jan. 2018; 51 pages.
ISO; "Optics and Photonics—Preparation of Drawings for Optical Elements and Systems—Part 1: General"; ISO 10110-1; Jul. 1, 2006; 27 pages.
Vilem, Jan, et al.; U.S. Appl. No. 16/156,794, filed Oct. 10, 2018; Title: Zoom Optical System; 24 pages.
Notice of Allowance dated May 17, 2019; U.S. Appl. No. 16/156,794, filed Oct. 10, 2018; 10 pages.
European Intention to Grant; Application No. 18192001.8; dated May 17, 2019; 7 pages.

* cited by examiner

AUTOMATED LUMINAIRE HAVING A ZOOM OPTICAL SYSTEM

CROSS-REFERENCE TO RELATED APPLICATIONS

This application claims priority to U.S. Provisional Application No. 62/553,324, filed Sep. 1, 2017 by Jan Vilem, et al. entitled "Zoom Optical System", which is incorporated by reference herein as if reproduced in its entirety.

TECHNICAL FIELD OF THE DISCLOSURE

The disclosure generally relates to an automated luminaire, specifically to a zoom optical system for use in an automated luminaire.

BACKGROUND

Luminaires with automated and remotely controllable functionality are well known in the entertainment and architectural lighting markets. Such products are commonly used in theatres, television studios, concerts, theme parks, night clubs and other venues. Such a luminaire may provide control over the direction the luminaire is pointing and thus the position of the light beam on the stage or in the studio. This directional control may be provided via control of the luminaire's orientation in two orthogonal axes of rotation usually referred to as pan and tilt. Some products provide control over other parameters such as the intensity, color, focus, beam size, beam shape and beam pattern.

SUMMARY

In a first embodiment, a zoom optical system includes a light source, a compensator lens group, a variator lens group, and an objective lens group. The light source illuminates an object located in an object plane. The compensator lens group is optically coupled to the object, has a first positive optical power, and is configured to move relative to the object plane. The variator lens group is optically coupled to the compensator lens group, has a negative optical power, and is configured to move relative to the object plane and the compensator group. The objective lens group is optically coupled to the variator lens group, has a second positive optical power, and is configured to remain in a fixed position relative to the object plane and to project an image of the object.

In a second embodiment, an automated luminaire includes a light source, a zoom optical system, and a controller. The light source is configured to emit a first light beam and illuminate an object located in an object plane. The zoom optical system includes a compensator lens group, a variator lens group, and an objective lens group. The compensator lens group has a first positive optical power, is configured to receive the first light beam as modified by the object, and is configured to emit a second light beam. The variator lens group has a negative optical power, is configured to receive the second light beam, and is configured to emit a third light beam. The objective lens group has a second positive optical power, is configured to remain in a fixed position relative to the object plane, to receive the third light beam, and to project an image of the object. The controller is configured to move the compensator lens group and the variator lens group independently along an optical axis of the zoom optical system.

BRIEF DESCRIPTION OF THE DRAWINGS

For a more complete understanding of this disclosure, reference is now made to the following brief description, taken in conjunction with the accompanying drawings in which like reference numerals indicate like features.

DETAILED DESCRIPTION

Preferred embodiments are illustrated in the figures, like numerals being used to refer to like and corresponding parts of the various drawings.

Disclosed herein is an automated luminaire that includes a light source, a controller, and a zoom optical system comprising three lens groups: a moveable, positive power compensator lens group, closest to the light source, a moveable, negative power variator lens group in the middle, and a fixed, positive power objective group, farthest from the light source.

Figure 1:
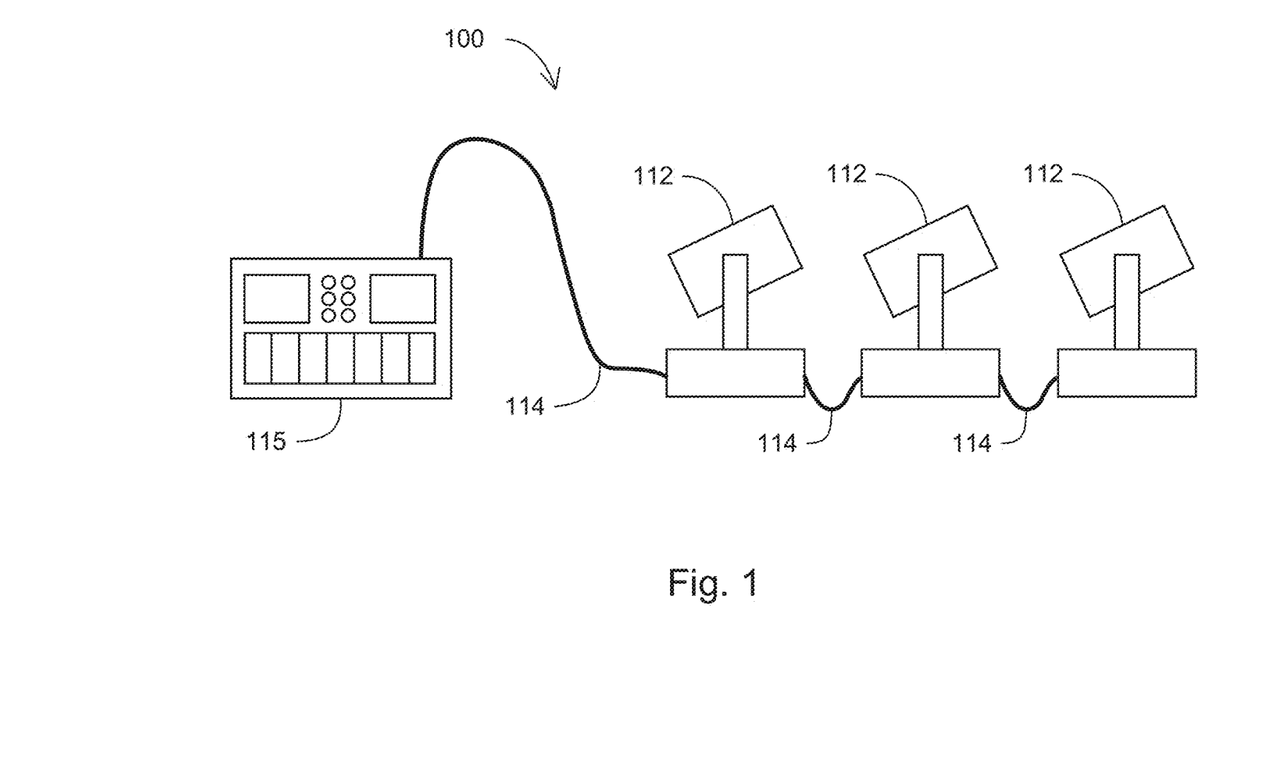
FIG. 1 presents a block diagram of a system including automated luminaires according to the disclosure.

FIG. 1 presents a block diagram of a system 100 including automated luminaires according to the disclosure. Lighting system 100 includes a plurality of multiparameter automated luminaires 112 according to the disclosure. Each luminaire 112 includes a light source, light modulation devices, electric motors coupled to mechanical drive systems, and control electronics. In addition to being connected to a power source either directly or through a power distribution system, each luminaire 112 is connected in series or in parallel via data link 114 to one or more control desks (or consoles) 115. The lighting system 100 is configured to be controlled by an operator using the control desk 115. While data link 114 is depicted as a wired communication link, it will be understood that in other embodiments the data link 114 may be a wireless communication link.

Control of an individual automated luminaire 112 is typically effectuated by electromechanical devices within the luminaire 112 and electronic circuitry including firmware and software within the control desk 115 and/or the luminaire 112. The luminaire 112 and its included electronic circuitry may also be referred to collectively as a fixture. In many of the figures herein, elements such as electromechanical components (including motors and electronic circuitry including software and firmware and some hardware) are not shown in order to simplify the drawings. Persons of skill in the art will recognize where these parts have been omitted.

Figure 2:
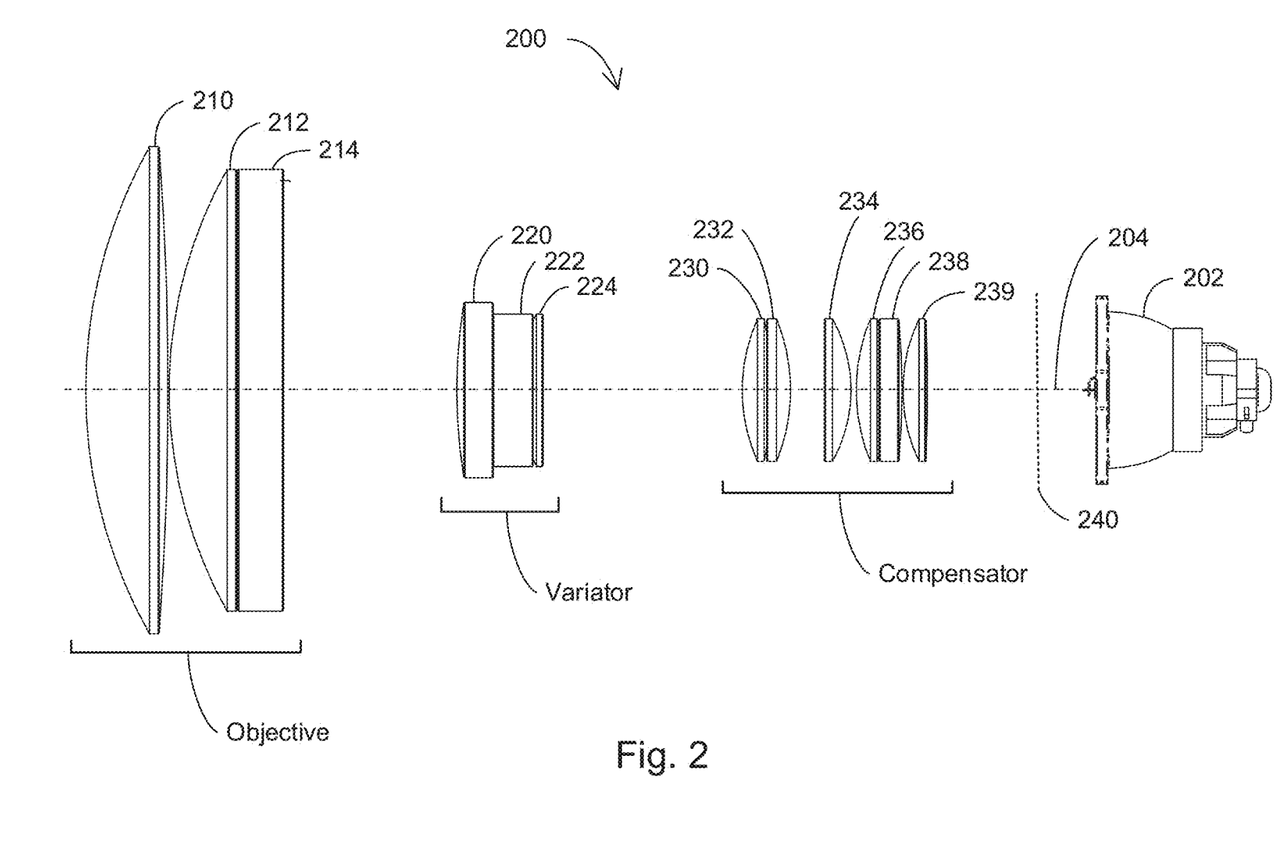
FIG. 2 presents a side view of the elements of a zoom optical system according to the disclosure.

FIG. 2 presents a side view of the elements of a zoom optical system 200 according to the disclosure, as used in one or more of the luminaires 112 in system 100. The zoom optical system 200 includes a light source 202 and three groups of lenses: the compensator group, the variator group, and the objective group. The objective group includes lenses 210, 212, and 214. The variator group includes lenses 220. 222 and 224. The compensator group includes lenses 230, 232, 234, 236, 238, and 239. The light source 202 and the compensator, variator, and objective lens groups are coaxially located on an optical axis 204 of the zoom optical system 200.

The compensator group lenses form a converging (or positive power) group, the variator group lenses form a diverging (or negative power) group, and the objective group lenses form a converging group. The compensator group has a focal length of 191.89 millimeters (mm), the variator group has a focal length of −39.534 mm, and the objective group has a focal length of 39.794 mm. For the purposes of this disclosure, group focal lengths within 10% of the disclosed lengths are considered substantially equal to the disclosed focal lengths.

As will be explained in more detail with reference to FIGS. 3 and 4, the compensator and variator groups are configured to move independently along the optical axis 204 relative to the light source 202, the objective group, and each other. The moving lens groups may be mechanically coupled to hand-operated manual controls or may be coupled to motors, linear actuators, or other electromechanically controlled mechanisms for motion. Such electromechanical mechanisms may be under the control of a microcontroller or other programmable processing system included in the light fixture. In some embodiments, the processing system may be controlled locally via a user interface included in the light fixture. In other embodiments, the processing system may be in wired or wireless communication with a remotely located control console that an operator uses to indicate a desired configuration for the zoom optical system.

FIG. 2 illustrates one embodiment of a zoom optical system according to the disclosure. The zoom optical system 200 includes an object plane 240. One or more objects to be imaged by the zoom optical system 200 are located in or adjacent to the object plane 240. Examples of objects to be imaged include a static or rotating gobo mounted on a gobo wheel or other gobo carrier, and a variable iris, an aperture wheel, or other mechanism for producing a light beam of a selected size. Where more than one such object to be imaged is included in the zoom optical system 200, it will be understood that the objects may be located in individual planes adjacent to the object plane 240. As shown in FIG. 2, the right end of the zoom optical system 200 may be referred to as the object end and the left end as the image end.

As may be seen in FIG. 2, the compensator lens group is optically coupled to the one or more objects in the object plane 240 without intervening lenses, the variator lens group is coupled to the compensator lens group without intervening lenses, the objective lens group is coupled to the variator lens group without intervening lenses, and the objective lens group projects an image of the one or more objects in the object plane 240 without further intervening lenses.

The lenses of this embodiment are described in Table 1, identified by their reference characters from FIG. 2. The column 'Descr.' presents a description of the shape of each lens, where "D" is a diameter of the lens, "RI" is a radius of curvature of the lens on its image side, and "RO" is a radius of curvature of the lens on its object side. All diameter and radius of curvature measurements are in mm. For the purposes of this disclosure, radii of curvature within 10% of the disclosed radii are considered substantially equal to the disclosed radii of curvature.

TABLE 1

| Ref. Char. | Descr. | Schott Glass Type | CDGM Glass Type | Power |
|---|---|---|---|---|
| 210 | D 150, RI 152.5, RO 1000.0 | N-BK7 | H-K9L | Pos |
| 212 | D 136, RI 138.1, RO 401.3 | N-BK7 | H-K9L | Pos |
| 214 | D 136, RI −401.3, RO −401.3 | N-SF6 | H-ZF7LA | Neg |
| 220 | D 54, RI 166.0, RO −34.5 | N-SK16 | H-ZK9A | Neg |
| 222 | D 47, RI −47.8, RO −58.1 | N-SK16 | H-ZK9A | Neg |
| 224 | D 47, RI 58.1, RO −5370.8 | N-SF6 | H-ZF7LA | Pos |
| 230 | D 44, RI 53.6, RO 119.3 | N-BK7 | H-K9L | Pos |
| 232 | D 44, RI −36.0, RO 57.8 | N-SF6 | H-ZF7LA | Neg |
| 234 | D 44, RI −297.1, RO 44.8 | N-BK7 | H-K9L | Pos |
| 236 | D 44, RI 57.1, RO 67.6 | N-BK7 | H-K9L | Pos |
| 238 | D 44, RI −52.0, RO 249.9 | N-SF6 | H-ZF7LA | Neg |
| 239 | D 44, RI 51.0, RO 530.8 | N-BK7 | H-K9L | Pos |

All lenses are spherical lenses. The columns "Schott Glass Type" and 'CDGM Glass Type' identify types of glass material for each lens, specified in a type designator notations used by their respective manufacturers. Schott glass is manufactured by Schott AG of Mainz, Germany. CDGM glass is manufactured by CDGM Glass Company Ltd. of Chengdu, China. Glass type values that include the letter "F" identify a lens made of flint glass. Glass type values that include the letter "K" identify a glass made of crown glass. "ZF" and "SF" indicate 'Dense Flint,' "ZK" and "SK" indicate 'Dense Crown,' and "BK" indicates 'Borosilicate Crown.' One or more of the lenses includes an antireflective coating applied to one or both surfaces of the lens. The column "Power" indicates whether the lens is a positive power ("Pos") lens or a negative power ("Neg") lens.

Table 2 describes spacing between lens pairs at center points of their adjacent surfaces. Because the pairs 212-214 and 222-224 are in contact with each other, they may be referred to as doublets. The spacing between lens pairs within the compensator, variator, and objective groups remains constant. The overall lengths of the objective, variator, and compensator groups are 60.9 mm, 26.5 mm, and 57.1 mm, respectively. These lengths do not change as the compensator and variator groups move relative to one another and the objective group along the optical axis 204.

TABLE 2

| Lens Pair | Spacing Between Lenses (mm) |
|---|---|
| 210-212 | 0.3 |
| 212-214 | contact |
| 220-222 | 13.288 |
| 222-224 | contact |
| 230-232 | 3.131 |
| 232-234 | 11.1 |
| 234-236 | 1.6 |
| 236-238 | 0.98 |
| 238-239 | 0.3 |

The compensator, variator, and objective lens groups of the zoom optical system 200 have six, three, and three lenses, respectively. It will be recognized by a person of skill in the art that, in other embodiments, positive/negative/positive compensator/variator/objective lens groups may comprise lens groups of more or fewer than six/three/three lenses each, including lens 'groups' with only a single lens.

A first light beam emitted by the light source 202 converges and illuminates an object to be imaged, located in the object plane 240, and then diverges as it approaches the compensator group. The compensator group receives the first light beam, as modified by any object placed in the first beam in the object plane 240, and emits a second light beam. The variator group receives the second light beam and emits a third light beam. The objective group receives the third light beam and emits a fourth light beam, which is the light beam emitted by the zoom optical system 200. The objective group remains in a fixed location relative to the light source 202, while both the variator and compensator groups move independently along the optical axis 204. As such, each of the compensator, variator, and objective lens groups may be said to be optically coupled to its preceding optical element in the zoom optical system 200.

Movement of the variator group primarily controls the overall focal length (light output angle or beam angle) of the emitted light beam. Movement of the compensator group primarily controls whether an object in the object plane 240 or in a plane adjacent to the object plane 240 is in focus. In combination, the positions of the compensator and variator groups determine a beam angle (zoom) of the emitted beam and a distance from the objective group at which a projected image of the object plane is focused. As such, the compensator, variator, and objective groups may also be referred to respectively as focus group, zoom group, and fixed group.

Figure 3:
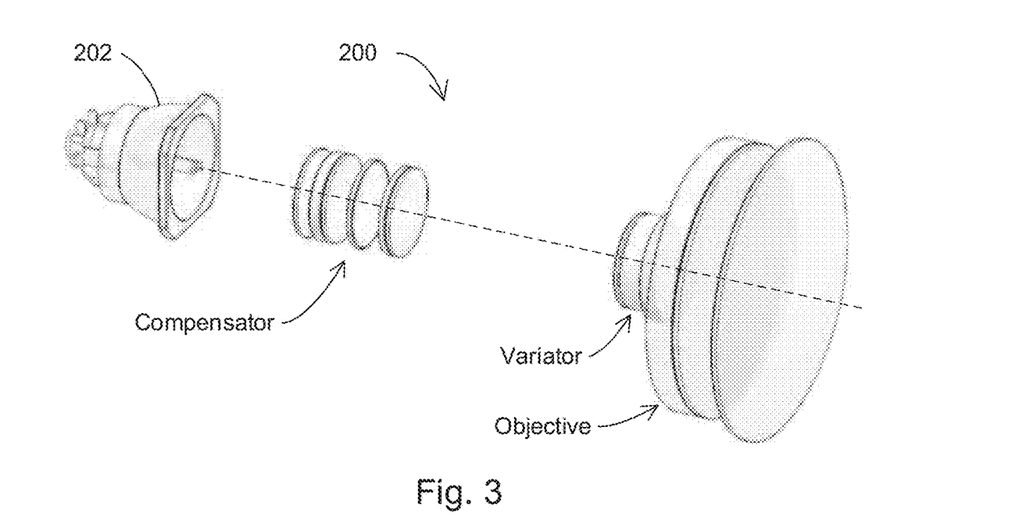
FIG. 3 presents an isometric view of the zoom optical system of FIG. 2 in a first configuration.
Figure 4:
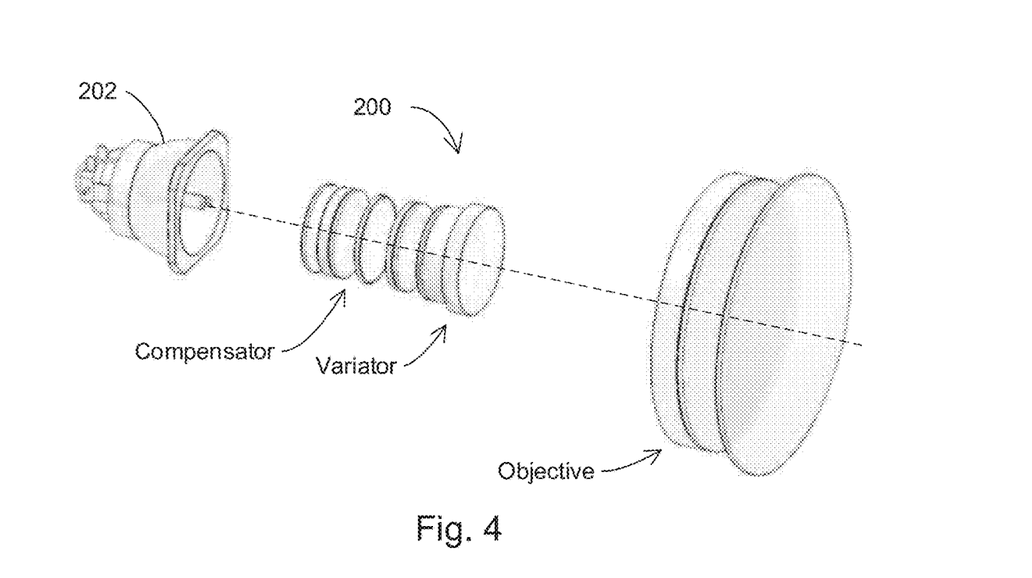
FIG. 4 presents an isometric view of the zoom optical system of FIG. 2 in a second configuration.

FIG. 3 presents an isometric view of the zoom optical system 200 of FIG. 2 in a first configuration. In the first configuration, the zoom optical system emits a light beam with a maximum beam angle. FIG. 4 presents an isometric view of the zoom optical system 200 of FIG. 2 in a second configuration. In the second configuration, both the compensator group and the variator group have moved back toward the light source 202 and the zoom optical system 200 emits a light beam with a minimum beam angle. The zoom ratio between the beam emitted in the second configuration and the beam emitted in the first configuration is 14:1.

Table 3 presents inter-group measurements in the first and second configurations. All measurements are in millimeters.

TABLE 3

|  | First Config. | Second Config. |
|---|---|---|
| Front of light source to image side of objective group | 336 | 336 |
| Front of light source to object side of compensator group | 103.3 | 69.3 |
| Object side of compensator group to object side of variator group | 137.5 | 62.5 |
| Object side of variator group to object side of objective group | 34.2 | 143.2 |

Figure 5:
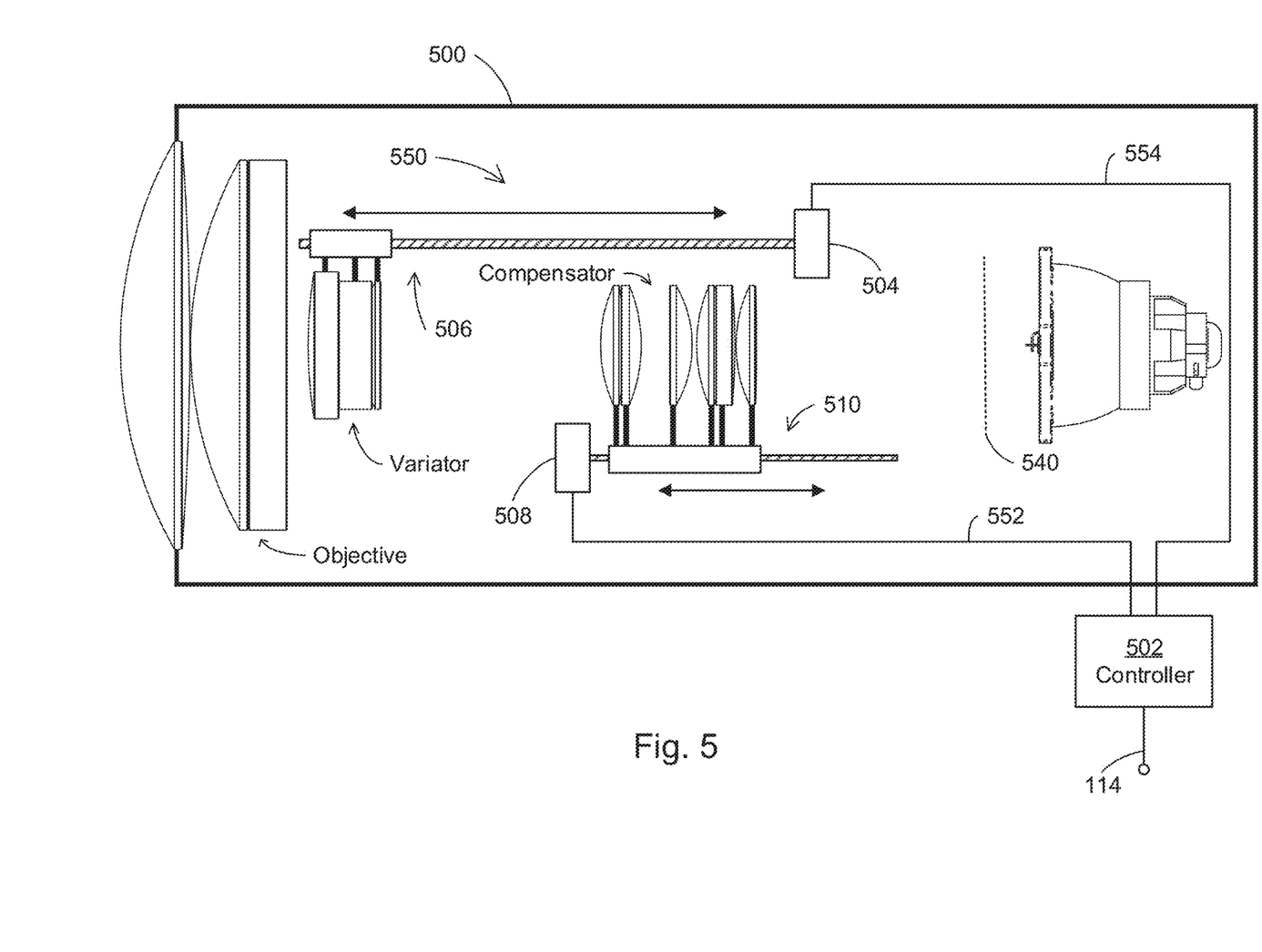
FIG. 5 presents a schematic block diagram of a moving head of an automated luminaire according to the disclosure.

FIG. 5 presents a schematic block diagram of a moving head 500 of an automated luminaire according to the disclosure, as used in one or more of the luminaires 112 in system 100. It will be understood that the moving head of a luminaire 112 would include other optical elements and mechanical system that are omitted from the moving head 500 for clarity of explanation.

The moving head 500 includes a zoom optical system 550 that is similar to the zoom optical system 200 and includes additional elements. The lenses of the objective group are fixedly coupled to the moving head 500. The lenses of the variator group are mechanically coupled to the moving head 500 via a drive mechanism 506 that is actuated by a motor 504. The lenses of the compensator group are mechanically coupled to the moving head 500 via a drive mechanism 510 that is actuated by a motor 508. The drive mechanisms 506 and 510 produce linear motion of the variator and compensator groups, respectively, along an optical axis 504 of the zoom optical system 550. The drive mechanism 506 and motor 504 and the drive mechanism 510 and motor 508 are lead screw mechanisms actuated by rotary motors, but it will be understood that in other embodiments cams, gears, sliders, linear actuators, linkages, or other suitable mechanisms may be used to provide linear motion of the compensator and/or variator groups.

A controller 502 (typically located in a static upper enclosure of the automated luminaire) controls the motor 504 via a control link 554, and controls the motor 508 via a control link 552. The control links 552 and 554 may be wires or optical signal conductors. The controller 502 is configured to receive control signals via a data link 114 (as described with reference to FIG. 1) and, in response to the received control signals, operate one or both of the motors 504 and 508 to move the variator and compensator groups, respectively, to desired positions relative to the object plane 540.

In a one embodiment, the controller 502 operates the motor 504 in response to a control signal on a first control channel of the data link 114 and operates the motor 508 in response to a control signal on a second control channel of the data link 114. The controller 502 is further configured to prevent the variator and compensator groups from colliding with each other when operating one or both of the motors 504 and 508.

The data link 114 uses DMX512 Digital Multiplex protocol, which is an industry standard, unidirectional communication protocol. In other embodiments, other communication protocols may be used, including Art-Net, ACN (Architecture for Control Networks), and Streaming ACN.

Figure 6:
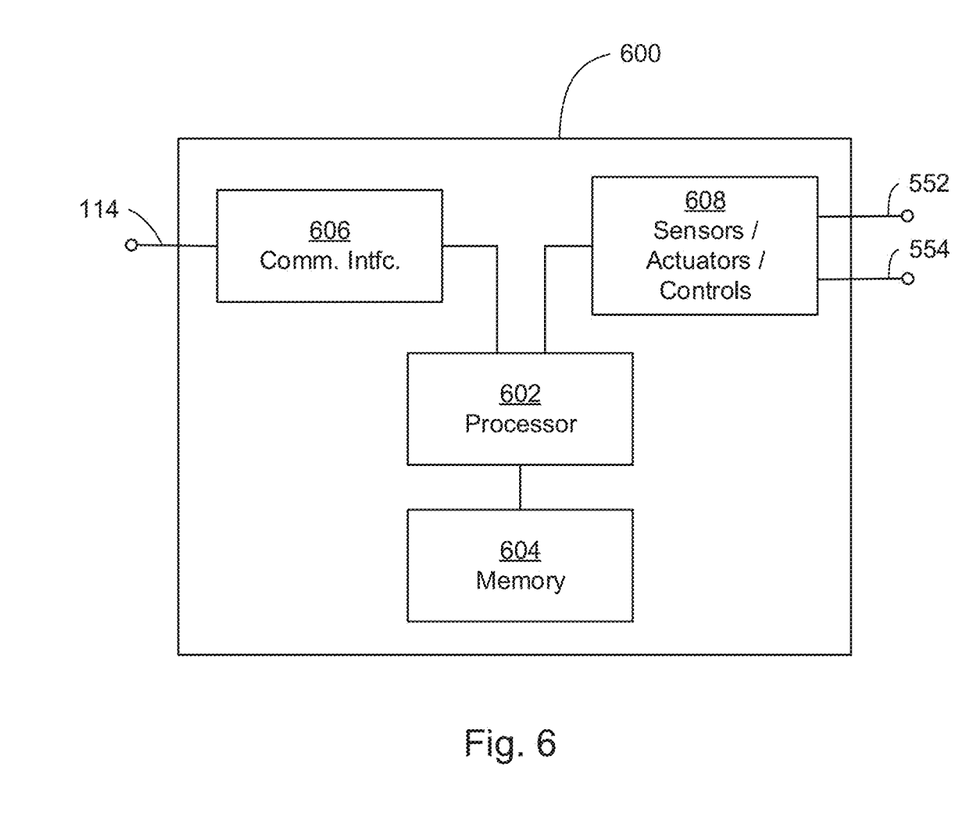
FIG. 6 presents a block diagram of a control system according to the disclosure.

FIG. 6 presents a block diagram of a control system 600 according to the disclosure. The control system 600 is suitable for use as the controller 502 described with reference to FIG. 5, as well as a controller in the automated luminaires 112 described with reference to FIG. 1. The control system 600 includes a processor 602 electrically coupled to a memory 604. The processor 602 is implemented by hardware and software. The processor 602 may be implemented as one or more Central Processing Unit (CPU) chips, cores (e.g., as a multi-core processor), field-programmable gate arrays (FPGAs), application specific integrated circuits (ASICs), and digital signal processors (DSPs).

The processor 602 is further electrically coupled to and in communication with a communication interface 606. The processor 602 is also coupled via control interface 608 to control links 552 and 554 and, in other embodiments, to one or more other sensors, motors, actuators, controls and/or other devices. The communication interface 606 is coupled to, and configured to communicate via, the data link 114.

The control system 600 is suitable for implementing processes, zoom optical system control, and other functionality as disclosed herein, which may be implemented as instructions stored in the memory 604 and executed by the processor 602. The memory 604 comprises one or more disks, tape drives, and/or solid-state drives and may be used as an over-flow data storage device, to store programs when such programs are selected for execution, and to store instructions and data that are read during program execution. The memory 604 may be volatile and/or non-volatile and may be read-only memory (ROM), random access memory (RAM), ternary content-addressable memory (TCAM), and/or static random-access memory (SRAM).

While the disclosure has been described with respect to a limited number of embodiments, those skilled in the art, having benefit of this disclosure, will appreciate that other embodiments may be devised which do not depart from the scope of the disclosure herein. While the disclosure has been described in detail, it should be understood that various changes, substitutions and alterations can be made hereto without departing from the spirit and scope of the disclosure.

What is claimed is:

1. A zoom optical system comprising:
a light source configured to illuminate an object located in an object plane or in a plane adjacent to the object plane;
a focus lens group, optically coupled to the object, having a first positive optical power, and configured to move relative to the object plane to control whether the object is in focus, the focus lens group comprising six lenses, the six lenses, listed in sequence beginning with a lens closest to the object plane, comprising crown glass, flint glass, crown glass, crown glass, flint glass, and crown glass;
a zoom lens group, optically coupled to the focus lens group, having a negative optical power, and configured to move relative to the object plane and the focus lens group, the zoom lens group configured to move while the focus lens group remains in a fixed position relative to the object plane for zooming, the zoom lens group comprising three lenses, the three lenses, listed in sequence beginning with a lens closest to the object plane, comprising flint glass, crown glass, and crown glass; and
a fixed lens group, optically coupled to the zoom lens group, having a second positive optical power, and configured to remain in a fixed position at all times relative to the object plane and to project an image of the object, the fixed lens group comprising three lenses, the three lenses, listed in sequence beginning with a lens closest to the object plane, comprising flint glass, crown glass, and crown glass.

2. The zoom optical system of claim 1, wherein focal lengths of the focus, zoom, and fixed lens groups are substantially equal to 191.89, millimeters (mm), −39.534 mm, and 39.794 mm, respectively.

3. The zoom optical system of claim 1, wherein the focus lens group and zoom lens group are further configured to be moved to selected relative positions by an operator of the zoom optical system.

4. The zoom optical system of claim 1, wherein the focus lens group and zoom lens group are configured to be moved to selected relative positions by a remotely located operator of the zoom optical system.

5. The zoom optical system of claim 1, wherein the zoom lens group comprises a first doublet and the fixed lens group comprises a second doublet.

6. The zoom optical system of claim 1, wherein:
the six lenses of the focus lens group, listed in sequence beginning with the lens closest to the object plane, comprise positive, negative, positive, positive, negative, and positive power lenses;
the three lenses of the zoom lens group, listed in sequence beginning with the lens closest to the object plane, comprise positive, negative, and negative power lenses; and
the three lenses of the fixed lens group, listed in sequence beginning with the lens closest to the object plane, comprise negative, positive, and positive power lenses.

7. The zoom optical system of claim 1, wherein:
the six lenses of the focus lens group, listed in sequence beginning with the lens closest to the object plane, comprise glass of types H-K9L, H-ZF7LA, H-K9L, H-K9L, H-ZF7LA, and H-K9L;

the three lenses of the zoom lens group, listed in sequence beginning with the lens closest to the object plane, comprise glass of types H-ZF7LA, H-ZK9A, and H-ZK9A; and
the three lenses of the fixed lens group, listed in sequence beginning with the lens closest to the object plane, comprise glass of types H-ZF7LA, H-K9L, and H-K9L.

8. The zoom optical system of claim 1, wherein:
the lenses of the focus lens group, listed in sequence beginning with the lens closest to the object plane, have substantially the following radii of curvature:

| RI | RO |
| --- | --- |
| 51.0 | 530.8 |
| −52.0 | 249.9 |
| 57.1 | 67.6 |
| −297.1 | 44.8 |
| −36.0 | 57.8 |
| 53.6 | 119.3; | the lenses of the zoom lens group, listed in sequence beginning with the lens closest to the object plane, have substantially the following radii of curvature:

| RI | RO |
| --- | --- |
| 58.1 | −5370.8 |
| −47.8 | −58.1 |
| 166.0 | −34.5; | and
the lenses of the fixed lens group, listed in sequence beginning with the lens closest to the object plane, have substantially the following radii of curvature:

| RI | RO |
| --- | --- |
| −401.3 | −401.3 |
| 138.1 | 401.3 |
| 152.5 | 1000.0, | where RI is a radius of curvature of an image side of the lens, RO is a radius of curvature of an object side of the lens, and all dimensions are in millimeters.

9. An automated luminaire, comprising:
a light source configured to emit a first light beam and illuminate an object located in an object plane or in a plane adjacent to the object plane;
a zoom optical system optically coupled to the light source, the zoom optical system comprising:
a focus lens group having a first positive optical power, configured to receive the first light beam as modified by the object, to emit a second light beam, to move relative to the object to control whether the object is in focus, the focus lens group comprising six lenses, the six lenses, listed in sequence beginning with a lens closest to the object plane, comprising crown glass, flint glass, crown glass, crown glass, flint glass, and crown glass;
a zoom lens group having a negative optical power, configured to receive the second light beam, to emit a third light beam, to move while the focus lens group remains in a fixed position relative to the object for zooming, the zoom lens group comprising three lenses, the three lenses, listed in sequence beginning with a lens closest to the object plane, comprising flint glass, crown glass, and crown glass; and a fixed lens group having a second positive optical power, configured to remain in a fixed position relative to the object plane, to receive the third light beam, to project an image of the object, to remain in a fixed position at all times relative to the object, the fixed lens group comprising three lenses, the three lenses, listed in sequence beginning with a lens closest to the object plane, comprising flint glass, crown glass, and crown glass; and a controller coupled to the focus lens group and the zoom lens group and configured to move the focus lens group and the zoom lens group independently along an optical axis of the zoom optical system.

10. The automated luminaire of claim 9, wherein:
the controller comprises:
a first drive mechanism mechanically coupled to the focus lens group; and
a second drive mechanism mechanically coupled to the zoom lens group; and
the controller is configured to actuate one or both of the first and second drive mechanisms to move the focus and/or zoom lens groups to desired positions relative to the object plane.

11. The automated luminaire of claim 10, wherein one or both of the first and second drive mechanisms is a lead screw mechanism actuated by a rotary motor.

12. The automated luminaire of claim 10, wherein the controller comprises a communication interface and is configured to operate one or both of the first and second drive mechanisms in response to a control signal received via the communication interface.

13. The automated luminaire of claim 12, wherein the controller operates the first drive mechanism in response to a first control signal received on a first control channel and operates the second drive mechanism in response to a second control signal received on a second control channel.

14. The automated luminaire of claim 12, wherein the controller is configured to prevent the zoom lens group and the focus lens group from colliding with each other when operating one or both of the first and second drive mechanisms.

15. The automated luminaire of claim 12, wherein the communication interface comprises a DMX512 Digital Multiplex protocol.

16. The automated luminaire of claim 9, wherein the zoom lens group comprises a first doublet and the fixed lens group comprises a second doublet.

17. The automated luminaire of claim 9, wherein:
the six lenses of the focus lens group, listed in sequence beginning with the lens closest to the object plane, comprise positive, negative, positive, positive, negative, and positive power lenses;
the three lenses of the zoom lens group, listed in sequence beginning with the lens closest to the object plane, comprise positive, negative, and negative power lenses; and
the three lenses of the fixed lens group, listed in sequence beginning with the lens closest to the object plane, comprise negative, positive, and positive power lenses.

18. The automated luminaire of claim 9, wherein:
the six lenses of the focus lens group, listed in sequence beginning with the lens closest to the object plane, comprise glass of types H-K9L, H-ZF7LA, H-K9L, H-K9L, H-ZF7LA, and H-K9L;
the three lenses of the zoom lens group, listed in sequence beginning with the lens closest to the object plane, comprise glass of types H-ZF7LA, H-ZK9A, and H-ZK9A; and
the three lenses of the fixed lens group, listed in sequence beginning with the lens closest to the object plane, comprise glass of types H-ZF7LA, H-K9L, and H-K9L.

* * * * *